United States Patent
Calamatas (10) Patent No.: US 6,525,647 B1
(45) Date of Patent: Feb. 25, 2003

(54) SYSTEM AND METHOD OF VERIFYING THE AUTHENTICITY OF INPUT SIGNALS

(75) Inventor: Philip J. Calamatas, Fabreville Laval (CA)

(73) Assignee: Westinghouse Air Brake Technologies, Wilmerding, PA (US)

( * ) Notice: Subject to any disclaimer, the term of this patent is extended or adjusted under 35 U.S.C. 154(b) by 0 days.

(21) Appl. No.: 09/348,991

(22) Filed: Jul. 7, 1999

(51) Int. Cl.$^7$ .................. G05B 19/00; G05B 23/00; G06F 7/00
(52) U.S. Cl. ................ 340/5.8; 714/819; 714/37
(58) Field of Search .............. 714/819, 37, 708; 340/5.8; 326/30

(56) References Cited

U.S. PATENT DOCUMENTS 5,396,122 A * 3/1995 Nesper .................. 307/326
5,727,110 A * 3/1998 Smith et al. ............. 385/147

OTHER PUBLICATIONS

Michael Gossel and Steffen Graf, Error Detection Circuits, 1993, McGraw–Hill, pp. 2–9.*

* cited by examiner

Primary Examiner—Michael Horabik
Assistant Examiner—Vernal Brown
(74) Attorney, Agent, or Firm—James Ray & Associates (57) ABSTRACT

A system verifies the authenticity of input signals used in the operation of an apparatus. The system includes two input registers, a microprocessor, and one circuit network for each input signal. Each circuit network generates twin binary signals in response to its input signal. Specifically, twin logic one signals are generated by a circuit network when its input signal goes active state. Conversely, twin logic zero signals are generated when the input signal goes inactive. Each circuit network conveys the first binary signal to a dedicated location in one input register and the second binary signal, after inversion, to a dedicated, mirror-imaged location in the other input register. Whenever any bit in either or both input registers changes, the microprocessor reads both input registers to ascertain the state of the bits they contain. Specifically, the bits in the first input register are read and conveyed to a first work register, with the bits in the second input register being re-inverted, reordered to match again the bit order of the first input register, and conveyed to a second work register. The microprocessor then compares each bit read from one work register with its corresponding twin bit read from the other work register. As long as each bit and its corresponding twin bit match, the microprocessor allows the apparatus to operate according to the dictates of the input signal(s) received. If any bit and its corresponding twin bit fail to match, the microprocessor can take whatever protective action is deemed appropriate.

18 Claims, 7 Drawing Sheets

SYSTEM AND METHOD OF VERIFYING THE AUTHENTICITY OF INPUT SIGNALS

CROSS-REFERENCE TO RELATED APPLICATIONS

This application is related to the following applications for patent: U.S. Ser. No. 09/099,260, now U.S. Pat. No. 6,032,416 titled Transit Vehicle Door, filed Jun. 18, 1998; U.S. Ser. No. 60/109,951, titled Intelligent Door Controller Unit, filed Nov. 25, 1998; and U.S. Ser. No. 09/200,497, now U.S. Pat. No. 6,175,204 titled Dynamic Brake For Power Door, filed Nov. 25, 1998. These applications are assigned to the assignee of the invention disclosed below, and their teachings are incorporated into this document by reference.

FIELD OF THE INVENTION

The invention generally relates to a Door Controller Unit (DCU) of the type typically used to control the operation of a door operator for a doorway of a passenger transit vehicle. More particularly, the invention relates to a system and method for verifying the authenticity of the door control signals that the DCU receives from a Central Door Controller (CDC).

BACKGROUND OF THE INVENTION

The background information below is provided to assist the reader to understand the environment in which the invention will typically be used. The terms used herein are therefore not intended to be limited to any particular narrow interpretation unless explicitly stated otherwise in this document.

Figure 1:
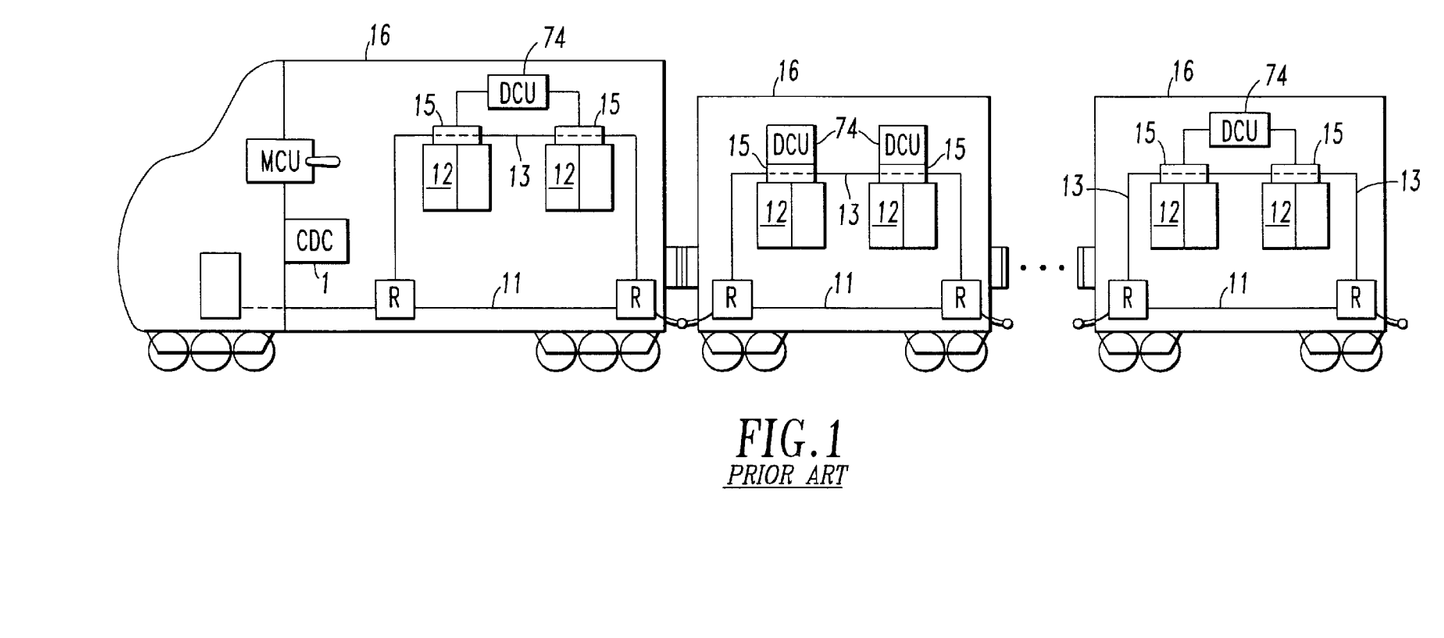
FIG. 1 illustrates a typical passenger transit train including the Central Door Controller (CDC) in the lead railcar, the Door Controller Units (DCUs) on each railcar to which the CDC is linked, and the door operator(s) which each DCU drives.

Shown in FIG. 1 is a typical passenger transit train. It has a lead railcar 16 and a plurality of trailing railcars 16 each linked serially by means of a mechanical coupler. Various electrical trainlines span the length of the train. Each trainline is composed of a series of interconnected wires or wire pairs, with each such wire/pair bundled (along with the wires/pairs of the other trainlines) within a protective conduit contained within each railcar. Each such conduit connects via a connector to another such conduit on a neighboring railcar so as to extend each trainline along the train. These trainlines are used to carry the electrical signals that are needed to operate and control the various systems on each railcar in the train.

Each railcar in the train typically has its own power distribution network (LVDN) from which it provides the relatively low voltage needed to power all of the electrical/electronic systems on the vehicle. The power level provided to the LVDN typically ranges from 12 to 150V dc (52V dc nominal), depending on the particular type of railcar at issue and the power requirements imposed by the transit authority.

Like the lead railcar, each of the trailing railcars may be equipped with one or more motors and a propulsion controller unit with which to control them. These propulsion controllers are connected by one or more trainlines to a master controller unit (MCU) located in the lead railcar. Using the controls of the MCU, a train operator can control, in addition to the mechanical brakes on each railcar, the operation of all of the propulsion controllers in the train. It is thus from the MCU that the train operator can operate the motors on all railcars in unison to propel or brake the train.

Transit railcars each have one or more doorways 12 through which passengers can enter and exit the vehicle. For railcars with more than one doorway, the openings 12 may be located in the same sidewall or opposite sidewalls of the vehicle. Near each doorway 12 is installed a Door Hardware System (DHS), also referred to as a door operator 15, to which the door panel(s) attach. The door operator is what actually moves the door panel(s) back and forth over the doorway to open and close the doors, depending on whether its pneumatic or electric motor is commanded to operate in the opening or closing direction. Plug doors, pocket doors, outside sliding doors and station platform doors are just some examples of the types of door systems currently being used in the transit industry.

The doors of the railcars in a passenger train are also centrally controlled from the lead railcar. Specifically, a central door controller (CDC) 1 housed in the lead railcar communicates with, and controls, one or more door controller units (DCU) 74 on each railcar through a number of discrete door control trainlines. The central command (i.e., door control) signals that the CDC 1 conveys along these trainlines each typically takes the form of a DC signal, the exact level depending on the requirements imposed by the transit authority. Each DCU 74 controls one or more door operators 15, and their associated motors, based on the input signals that it receives from two sources: (1) the central command (i.e., door control) signals received from the CDC 1 via such trainlines and (2) the various local door hardware signals received from the door operator(s) 15 and related hardware.

Transit authorities typically use a separate trainline to convey, to the DCUs on every railcar in the train, each of the central command signals. The following central command signals are typical: door unlock, door open, door close, door lock, side select enable, cliff side select enable, zero speed, park brake applied, and low speed. As noted earlier, there are many different types door systems in use in the passenger transit industry. Consequently, not every transit authority uses every one of the aforementioned central command signals. In some systems, for example, the door unlock and lock signals may be subsumed by the door open and close signals, respectively.

Each door control trainline typically takes the form of a single-switched input format or a doubled-switched input format. The particular format depends on the preference and tradition of the transit authority at issue. In the single-switched format, only the main input line is activated when a central command signal is sent, its associated return line (commonly the ground) being hardwired to the CDC. In the doubled-switched format, both the input line and its associated return are activated together at the CDC. When a double-switched input is not in use, both of its lanes are shorted together at the CDC to reduce the chance that unwanted bias voltages (or ground loops) will inadvertently be interpreted by a DCU as a valid incoming central command signal.

The electrical characteristics of the central command signals are also prescribed by the transit authorities. Some transit authorities implement their central command signals as a −50V DC signal, referenced to ground. The voltage, current, polarity and other attributes of the central command signals, however, vary among transit authorities. For this reason, the input circuitry of a DCU must be designed to comport with the input requirements imposed by the transit authority.

The electromagnetic environment in which a transit train operates has profound affect on the electronic circuitry of a DCU. As an electrically powered conveyance, a transit train typically acquires the energy it needs to power its operations from an overhead catenary, a third rail or similar power carrying conduit. An energy collector, mounted to at least one railcar in the train, rides along the power conduit as the train travels along its route of travel. The energy is conveyed from the power conduit through the energy collector and ultimately delivered to the power distribution networks and the propulsion controller units on the train. It is well known that voltages spikes are inflicted on the powered systems of a moving train as the energy collector bridges the small gaps between adjacent segments of the power conduit. Nearby radio and TV transmitters, power transmission lines, lightning, cellular telephones and other emissive sources add to the hostile electromagnetic environment in which the electrical/electronic systems of the train operate.

These adverse electrical influences tend to induce unwanted voltages and other spurious noise within the door control trainlines. Unless filtered out by the input circuitry of a DCU, such electrical noise can obscure, or, under the right conditions, even be confused with, the electrical characteristics of the central command signals. Left unfiltered, or otherwise inadequately protected, such noise can conceivably be interpreted by a DCU as a valid incoming central command signal and cause the doors to operate unintendedly. For this reason, transit authorities usually require the door control trainlines to be well filtered and optically coupled to the DCUs.

The input circuitry of prior art DCUs have therefore been designed to include filter circuitry and an optocoupler for each one of the discrete door control trainlines strung from the CDC. Commonly used to couple electronic systems that operate at different voltages, each optocoupler in a DCU provides high electrical isolation between one trainline input and its corresponding electronics inside the DCU. An optocoupler does this by converting the incoming central command signal to light and then reconverting it to an electrical signal for use by the DCU. The optocouplers serve collectively to isolate a DCU from the high voltages that may be induced in the trainlines. Together the filter circuitry and optocouplers prevent the transmission of unwanted noise and protect against the adverse electrical influences that could otherwise damage a DCU and, worse, cause its doors to operate unintendedly.

Despite their widespread use in the transit industry, optocouplers pose several problems to the designers of DCUs. Some of these problems are just inherent to optocoupler devices, regardless of the manufacturer. It is well known that an optocoupler exhibits a variety of failure modes and, consequently, a very poor life expectancy. Other failure modes notwithstanding, an optocoupler as it ages will experience a steady degradation in its performance. This is manifested as a gradual loss over time in its ability to emit light. Bad optocouplers have caused prior art DCUs to fail to recognize, and thus fail to react to, the incoming door control signals.

Optocouplers have traditionally been incorporated into prior art DCUs in a manner that delays the detection of failed optocouplers. Most manufacturers have programmed their DCUs to take appropriate protective action whenever a central command signal is received out of sequence or not received at all. For example, reception of a door close signal while the doors are closed could indicate that an earlier door open signal was not received. Such a fault could trap passengers within the affected railcar because the train might be leaving the station by the time the failure is reported to the DCU. A degraded optocoupler in the door open trainline can cause just such a failure. It would be preferable, of course, to make the train operator aware of the problem when, not after, the fault has occurred. Unfortunately, all prior art DCUs are known to be incapable of detecting a failure in any of their optocouplers until there is a disruption in the normal sequence in which the central command signals, and related signals, are received. A method of, or circuitry for, detecting a failed optocoupler earlier in the sequence, without the need to wait for such a disruption, would be a welcome development in the passenger transit industry.

OBJECTIVES OF THE INVENTION

It is, therefore, a primary objective of the invention to provide a system and method for verifying the authenticity of input signals used in the operation of an apparatus.

Another objective is to provide a mirror-image optoisolator device that optically couples an intelligent DCU (IDCU) to the trainlines strung from a CDC of a train and conveys the two separately optically isolated signals generated by the device for each trainline to two separate, but mirror-imaged, locations in separate input registers in the IDCU.

Yet another objective is to provide a mirror-image optoisolator device that can be used to optically couple any suitable electronic apparatus to the electrical lines strung from external componentry and to convey the two separately optically isolated signals generated by the device for each line to two separate, but mirror-imaged, locations in separate registers in the apparatus, as part of a system and/or method to assure not only the veracity of the incoming input signals but also the integrity of the circuitry itself.

Still another objective of the invention is to isolate electrically the electronic circuitry of a DCU from the potentially harmful electrical influences often induced in the discrete trainlines that are used to carry input signals from a central door controller (CDC) to the DCU.

A further objective is to endow the aforementioned system and method with the ability to test the operation and integrity of the I/O-CPLD, the complex programmable logic device that handles the input and output functions of the IDCU.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

In a presently preferred embodiment, the invention provides a system for verifying the authenticity of input signals used in the operation of an apparatus. The system includes two input registers, a microprocessor unit, and one circuit network for each of the input signals that the apparatus is designed to receive. Each circuit network generates twin binary signals in response to its input signal. Specifically, twin logic one signals are generated by a circuit network when its input signal assumes an active state. Conversely, twin logic zero signals are generated by a circuit network when its input signal assumes an inactive state. Each register has one bit location dedicated to each circuit network. Each circuit network conveys the first binary signal to its proper location in the first input register and the second binary signal, after inversion, to the corresponding, mirror-imaged location in the second input register. The bit order of one input register is thus the reverse of the other. Using an interrupt protocol, the microprocessor unit is alerted whenever any bit in either or both registers changes. Whenever such change is detected, the microprocessor unit reads both input registers to ascertain the state of the bits they contain. Specifically, the bit values in the first input register are read and conveyed to a first work register, with the bit values in the second input register being re-inverted, bit-reordered to again match the bit order of the first input register, and conveyed to a second work register. The microprocessor then compares each bit read from one work register with its corresponding twin bit read from the other work register. As long as each bit and its corresponding twin bit match, the microprocessor will allow the apparatus to operate according to the dictates of the input signal(s) received. If any bit and its corresponding twin bit fail to match, the microprocessor unit will carry out whatever protective action it is programmed to take.

In a related aspect, the invention provides a method of verifying the authenticity of input signals to be used in the operation of an apparatus. The first step of the method involves generating twin representations for each of the input signals. Specifically, for each input signal, the twin representations are manifested either as a logic one or a logic zero, the logic level depending on the state of the input signal. The next step involves conveying the twin representations, for each input signal, to certain designated locations in two input registers. Specifically, for each input signal, a first of the twin representations is conveyed to a dedicated location in the first input register whereas a second of the twin representations, after inversion, is conveyed to a corresponding, mirror-imaged location in the second input register. The bit order of the second input register is thus the reverse of that of the first input register. The next step involves monitoring all of the locations in one or both input registers for whether any bit contained therein has changed. Whenever any such change is detected, the reading step is performed. This involves reading all of the locations of both input registers to ascertain the state of the bits they contain. Specifically, the values of the bits in the first input register are read and then stored locally in a first work register, with the values of the bits in the second register being (i) re-inverted to undo the earlier inversion, (ii) reordered to match again the order of the bits read from the first input register, and (iii) stored locally in a second work register. In the comparison step, each bit in one work register is compared with its corresponding twin bit in the other work register. The outcome of the final step depends on whether all bit pairs match. If each bit read from one work register matches its corresponding twin bit read from the other work register, the final step is manifested as a command to the apparatus to operate according to the dictates of input signal(s) it received. If any bit and its corresponding twin bit fail to match, the final step involves commanding the apparatus to take whatever protective action is deemed appropriate.

DETAILED DESCRIPTION OF THE INVENTION

The reader is advised that, for the sake of clarity and ease of understanding, the invention is described in the following text as if implemented in the Intelligent Door Controller Unit (IDCU) disclosed in one or more of those documents previously incorporated herein by reference. Despite being described in this particular context, it should be apparent from a reading of this document that the invention can be applied to myriad other apparatuses. This is particularly true for an apparatus whose circuitry requires optical isolation from the wires on which it receives the input signals necessary for the apparatus to operate. The invention is presented is in this context not to limit the scope of the claims set forth below but merely to simplify the description, and hence the understanding, of the invention.

The IDCU is organized into three modules: a CPU card 200, a motor driver & input/output (MD-I/O) card 300 (shown in part), and a power supply card (not shown). Each of these cards features a printed circuit board onto which an industry-standard bus structure, such as the PC-104 embedded processor interface, has been laid out. It is into this bus structure that the addressable components of the invention have been incorporated.

Designed to serve as the motherboard for the IDCU, the MD-I/O card 300 has upwardly disposed connectors built into its bus structure. Being physically linked to the motherboard via such connectors, the CPU and power supply cards are stacked horizontally atop the MD-I/O card 300. This allows the IDCU to be contained compactly within a single enclosure.

Figure 2A:
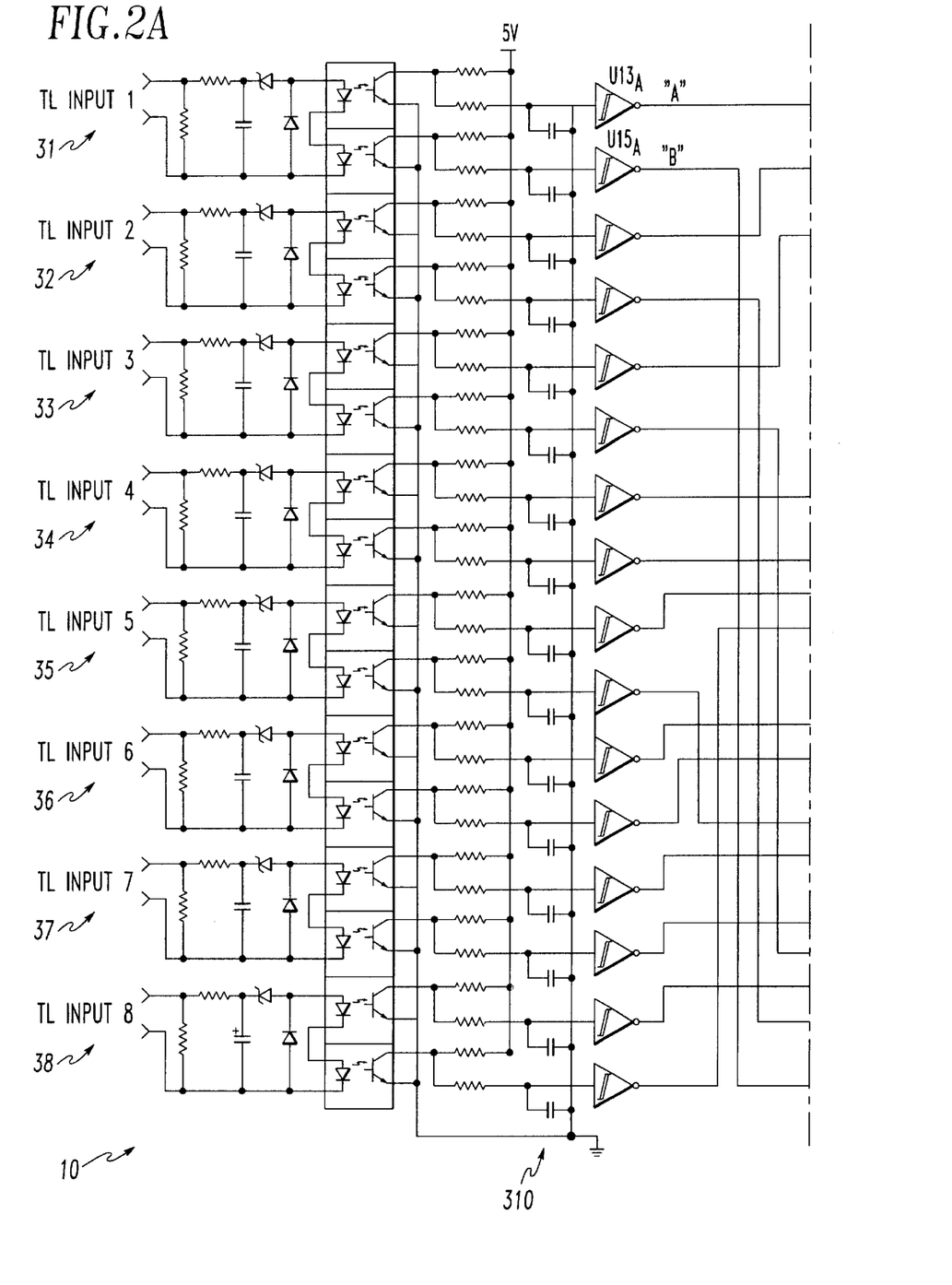
FIGS. 2A–2C illustrate a schematic of a mirror-image optoisolator device showing the array of circuit networks that comprise the device, in addition to the two input registers and the microprocessor unit used therewith.
Figure 2B:
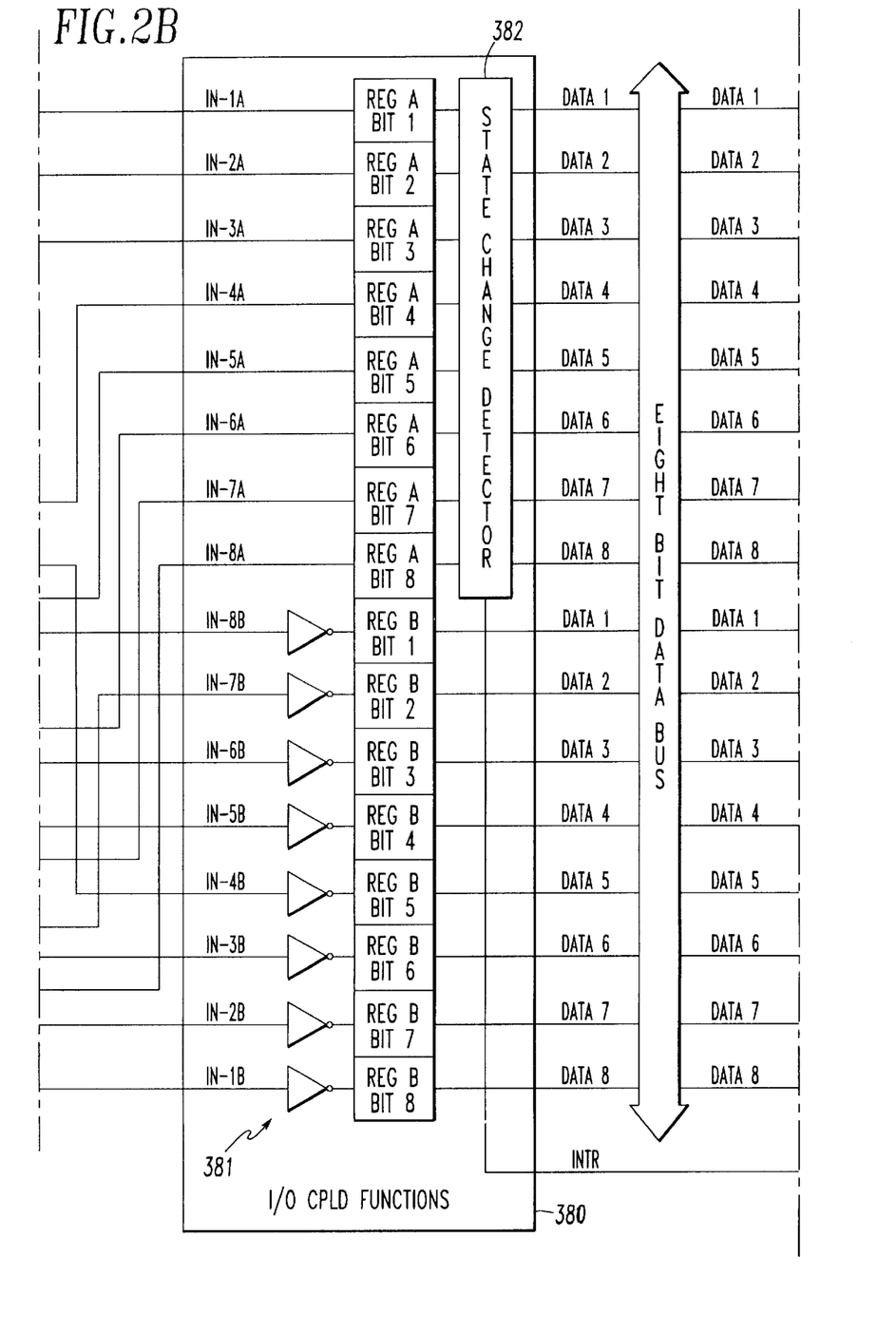
Figure 2C:
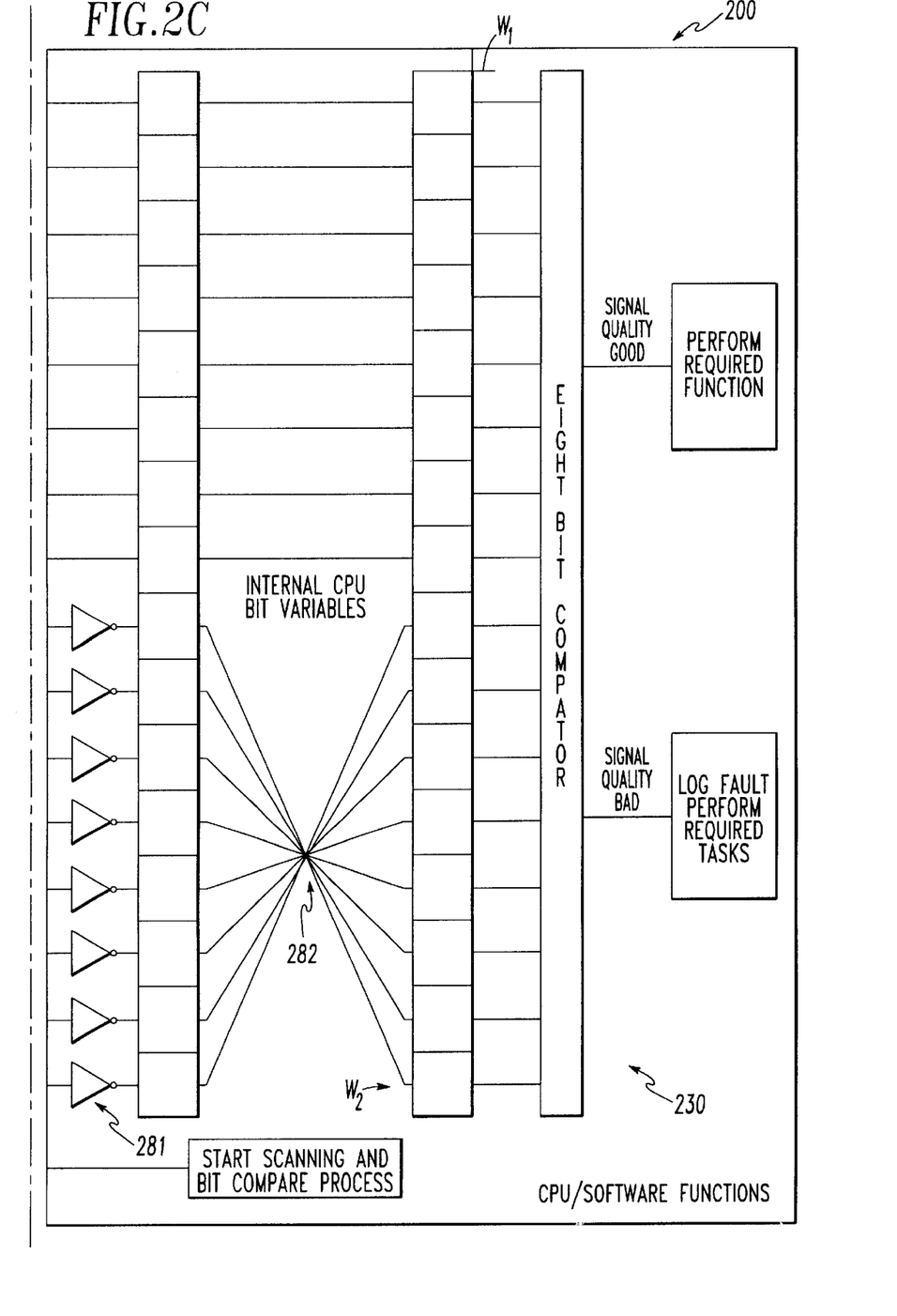

The CPU card 200 includes a microprocessor, generally designated 230, as is shown in FIG. 2C. It is accompanied by the appropriate volatile and non-volatile memories to store data and programming code. The microprocessor 230 is also accompanied by various complex programmable logic devices (CPLDs) to perform CPU-type functions such as address decoding and buffering.

Among other important components, the MD-I/O card 300 includes a novel mirror-image optoisolator device 310, several CPLDs, a motion control processor (not shown), and an H-bridge amplifier (not shown). The MD-I/O card 300 handles the motion control functions inclusive of controlling its H-bridge amplifier to drive the motor of the door operator.

Functionally, the IDCU employs a triad architecture whose primary elements include the microprocessor 230 on the CPU card 200 and the motion control processor and CPLDs on the MD-I/O card 300. Each element in the triad is designed not only to perform its own tasks but also to validate the operation of the other two elements in the triad. Operating together according to a procedural approach, all three elements must concur on each critical operation (e.g., door opening). Should one or more of the triad elements fail to validate any critical operation, that operation will not be performed and a record of the event will be recorded for diagnostic and other purposes.

One CPLD critical to the operation of the MD-I/O card 300 is the I/O-CPLD 380, as it handles the input and output functions of the IDCU. It is through the I/O-CPLD that the door control signals and the local door hardware signals are input into the IDCU. It is well known that the validity of the door control signals is considered critically important because a fault anywhere in the path that these signals follow into a DCU can give rise to serious problems within any door system. Consequently, of particular relevance to the invention disclosed herein are the optoisolator device 310 and the two input registers A and B in the I/O-CPLD chip, as shown in FIGS. 2A and 2B.

FIGS. 2A–C and 3A–B illustrate the essential details of the invention, namely, a system 10 for verifying the authenticity of the door control signals used to control the operation of the IDCU. In a presently preferred embodiment, the system 10 includes the mirror-image optoisolator device 310, the two input registers A and B and the microprocessor 230. The optoisolator device 310 is designed to be connected directly to each of the door control trainlines provided by the transit authority. The purpose of the optoisolator device 310 is to convey logic signals to two separate locations—one in each input register—for each of the door control signals conveyed along the trainlines by the CDC 1.

The optoisolator device 310 is comprised of an array of circuit networks 31–38, with each circuit network connected to one of the door control trainlines. Each circuit network should be designed to accept one central command signal whether that door control signal is conveyed on a trainline having the single-switched or the doubled-switched input format. Moreover, all of the circuit networks in the optoisolator device 310 will generally be identical in design. This, of course, depends on whether the door control signals that the transit authority uses all have the same or different signal characteristics.

Figure 3A:
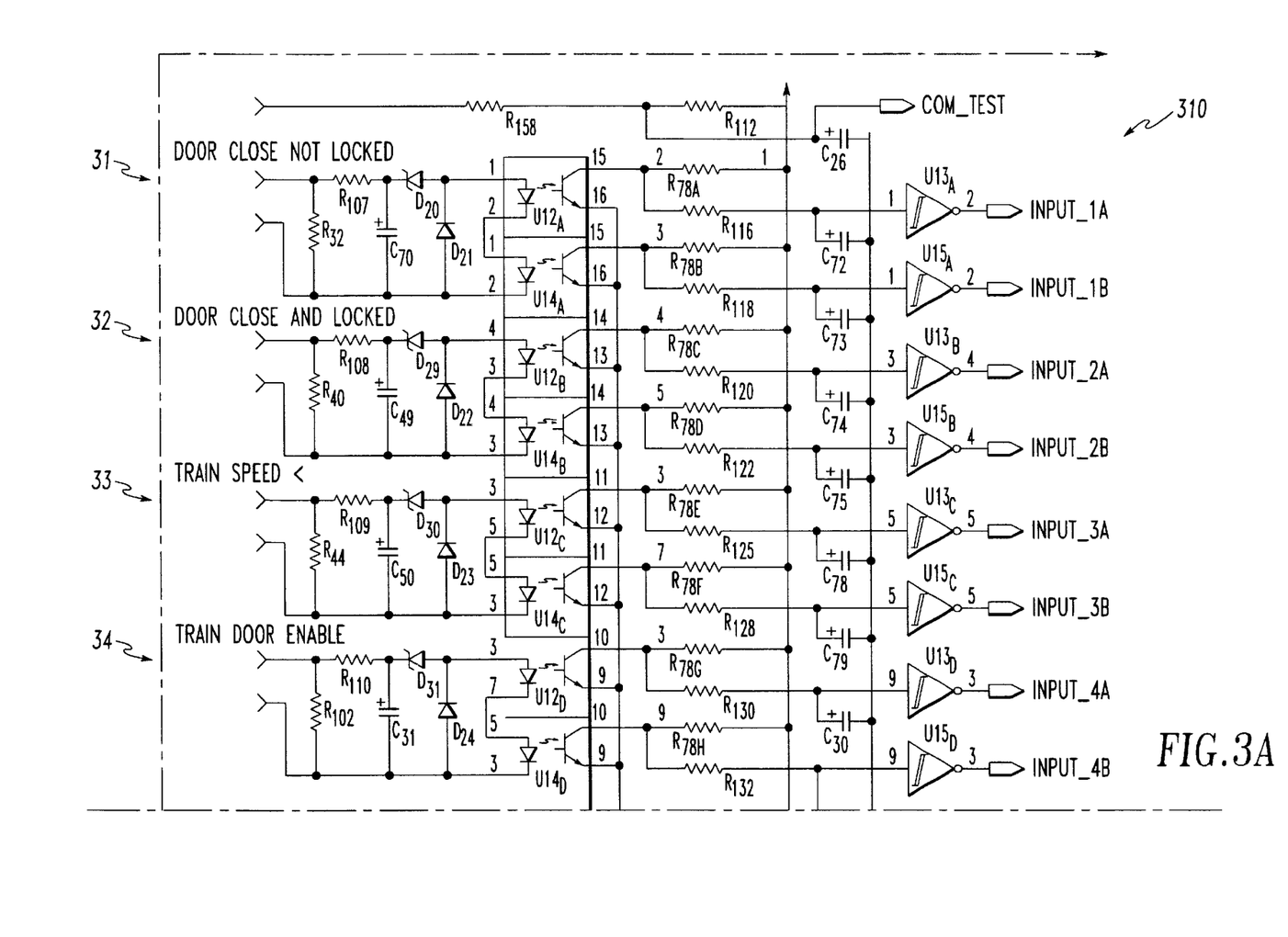
FIGS. 3A and 3B constitutes a schematic of a mirror-image optoisolator device, similar to that shown in FIG. 2A, except for the difference in design of the circuit networks of the array and the omission of both the microprocessor unit and the two input registers for brevity.
Figure 3B:
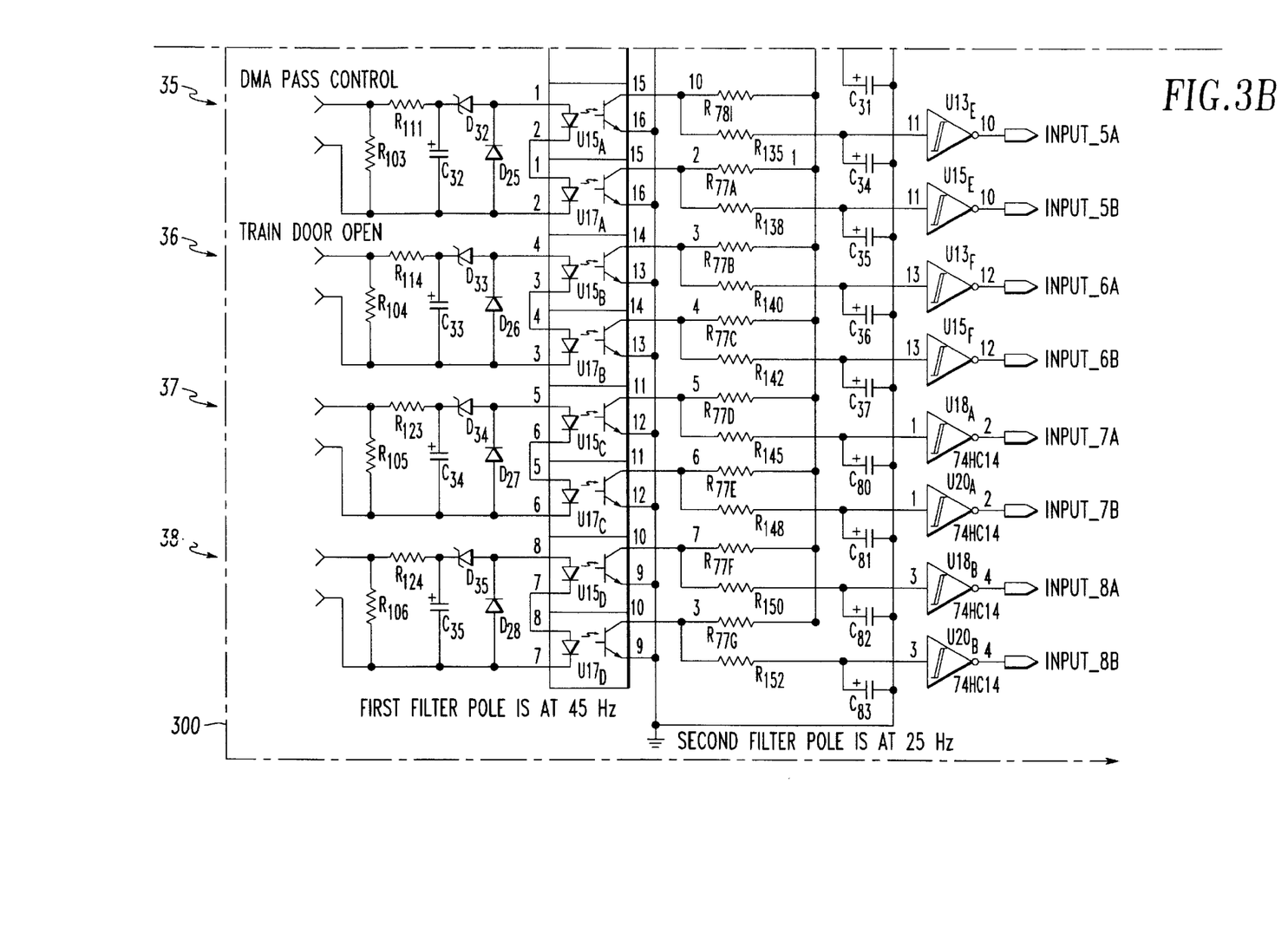
Figure 4:
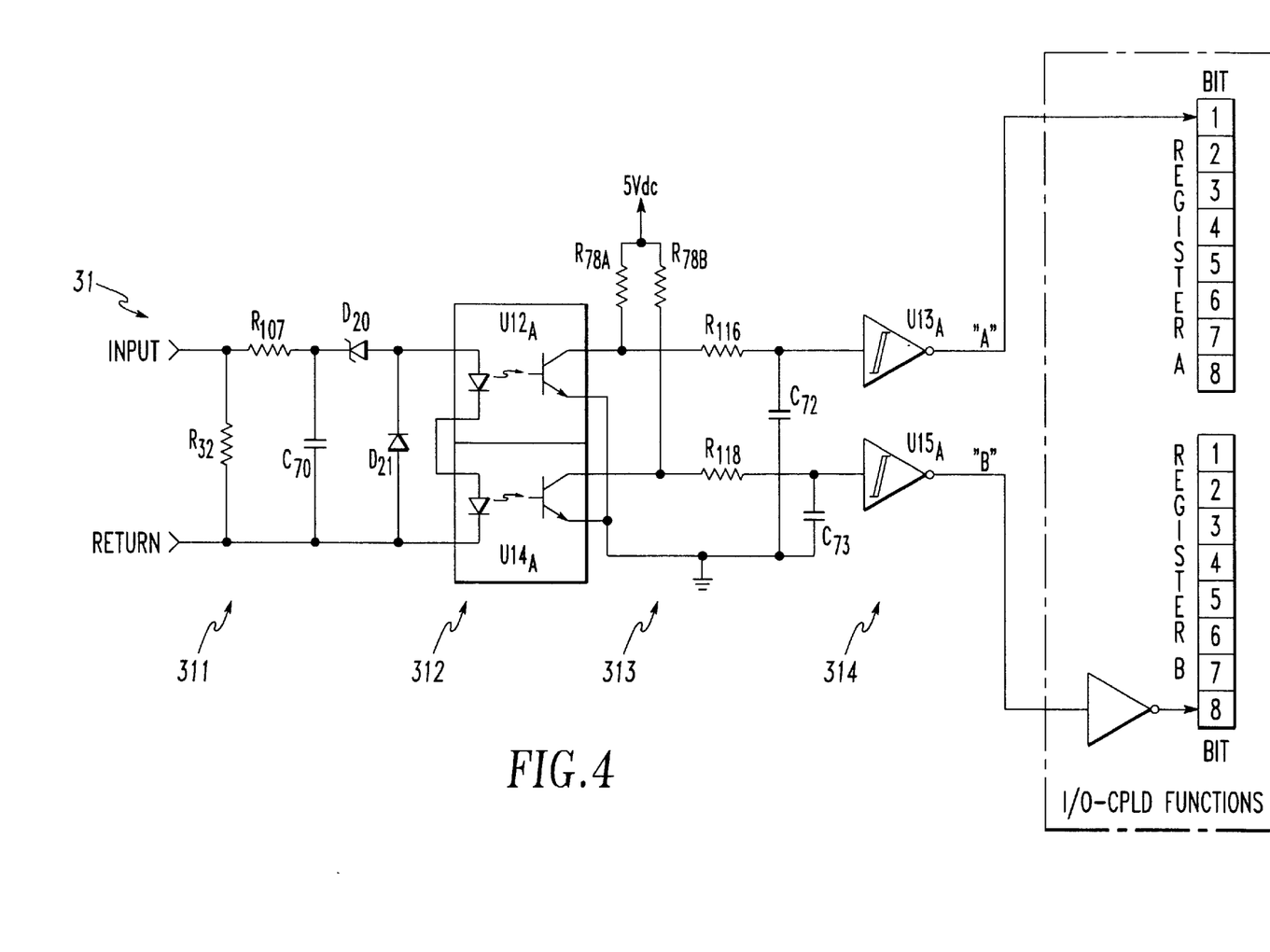
FIG. 4 is an enlarged schematic of one of the circuit networks shown in FIGS. 3A and 3B, showing the bifurcation of the input signal path and the two mirror-imaged bit locations in the two input registers to which it conveys logic signals.

FIG. 4 illustrates the first or top circuit network 31 in the array depicted in FIGS. 3A and 3B. Like all of the other circuit networks 32–38 in the device 310, this circuit network 31 includes a first filter stage 311, an optoisolation stage 312, a second filter stage 313 and an output stage 314.

The first filter stage 311 includes the input and return terminals, resistor $R_{32}$, resistor $R_{107}$, capacitor $C_{70}$, Zener diode $D_{20}$ and diode $D_{21}$. The input and return terminals connect to the input and return lines, respectively, of the incoming door control trainline. Resistor $R_{32}$ connects across the input and return terminals. Resistor $R_{107}$ connects between the input terminal and a node common to the cathode of Zener diode $D_{20}$ and the positive terminal of capacitor $C_{70}$. By its ground terminal, capacitor $C_{70}$ also connects to the return terminal. Zener diode $D_{20}$ connects by its anode to the upper input terminal of the optoisolation stage 312. Diode $D_{21}$ connects by its cathode to the upper terminal of the optoisolation stage 312 and by its anode to the lower input terminal of stage 312.

FIG. 4 also shows that, for each circuit stage beyond the first filter stage 311, the circuit path that the central command signal follows is duplicated. Specifically, the optoisolation stage 312 includes optocouplers $U12_A$ and $U14_A$. The second filter stage 313 has two filter circuits, one for each optocoupler. The top filter circuit consists of resistor $R_{116}$ and capacitor $C_{72}$ whereas the bottom filter circuit consists of resistor $R_{118}$ and capacitor $C_{73}$. Likewise, the output stage 314 is divided into two inverting Schmitt trigger circuits $U13_A$ and $U15_A$, one for each filter circuit in second filter stage 313.

Regarding optoisolation stage 312, the optocouplers $U12_A$ and $U14_A$ can be selected from a variety of commercially available solid state devices, with due regard to factors such as cost and the environment in which the invention is to be used. Each optocoupler is preferably implemented as a ILQ-2 unit. It is produced by the Seimens Company in chip form, with four optocouplers integrated into a single chip. As is known in the optoelectronic arts, such an optocoupler features a photoemitter and a photodetector. The photoemitter takes the form of a light-emitting diode (LED) whose wavelength typically lies within the infrared part of the electromagnetic spectrum. The LED in the ILQ-2 unit typically requires a minimal DC current, typically 5–20 mA, flowing between its leads to allow it to emit light. The photodetector is a junction transistor whose base is aligned so that it will be exposed to the light emitted by the LED.

The transistor of optocoupler $U12_A$ connects by its collector and emitter leads to the input terminals of the top filter circuit in second filter stage 313. Likewise, the transistor of optocoupler $U14_A$ connects by its collector and emitter leads to the terminals of the bottom filter circuit.

The LED of optocoupler $U12_A$ connects by its anode to the node shared by the anode of Zener diode $D_{20}$ and the cathode of diode $D_{21}$. By its cathode, the LED of optocoupler $U12_A$ also connects to the anode of the LED of optocoupler $U14_A$. Like the anode of diode $D_{21}$, and the ground terminals of capacitor $C_{70}$ and resistor $R_{32}$, the LED of optocoupler $U14_A$ connects by its cathode to the return terminal of first filter stage 311. The anode of the LED of optocoupler $U12_A$ and the cathode of optocoupler $U14_A$ thus constitute the upper and lower input terminals, respectively, of the optoisolation stage 312.

Referring to the "A" signal path of circuit network 31 in second filter stage 313, resistor $R_{116}$ in the top filter circuit connects between the signal input terminal of Schmitt trigger circuit $U13_A$ and the collector of the transistor of optocoupler $U12_A$. The emitter of this transistor connects to the ground line of the circuit, as does the ground terminal of capacitor $C_{72}$. Capacitor $C_{72}$ connects by its positive terminal to the node shared by resistor $R_{116}$ and the signal input terminal of Schmitt trigger circuit $U13_A$. Bias resistor $R_{78A}$ connects between feed voltage and the collector terminal of the transistor of optocoupler $U12_A$.

Referring now to the "B" signal path of circuit network 31 in second filter stage 313, resistor $R_{118}$ in the bottom filter circuit connects between the signal input terminal of Schmitt trigger circuit $U15_A$ and the collector of the transistor of optocoupler $U14_A$. The emitter of this transistor connects to the ground line of the circuit, as does the ground terminal of capacitor $C_{73}$ and the emitter of the transistor in optocoupler $U12_A$. Capacitor $C_{73}$ also connects by its positive terminal to the node shared by resistor $R_{118}$ and the signal input terminal of Schmitt trigger circuit $U15_A$. Bias resistor $R_{78B}$ connects between the 5V DC power feed voltage and the collector terminal of the transistor in optocoupler $U14_A$.

Regarding output stage 314, Schmitt trigger circuit $U13_A$ connects by its signal input terminal to the output of the top filter circuit for optocoupler $U12_A$. Likewise, Schmitt trigger circuit $U15_A$ connects by its signal input terminal to the output of the bottom filter circuit for optocoupler $U14_A$. Each Schmitt trigger circuit of the invention can be implemented as a 74HC14, a high speed CMOS circuit. Such Schmitt triggers are commercially available in chip form, with a plurality of circuits typically being integrated into a single chip. Harris Semiconductor, Motorola Inc., and National Semiconductor Corporation are just some of the companies that produce such chips. For this reason, the power feed and other terminals of the Schmitt triggers circuits are not shown in the figures for the sake of brevity.

FIG. 2B illustrates that the I/O-CPLD chip 380 contains an array of inverters 381, one for each of the "B" signal paths in circuit networks 31–38. The inverter for circuit network 31, for example, is shown in FIG. 4. It connects between the output of Schmitt trigger circuit $U15_A$ and the bit 8 location of input register B. The inverter array 381, and its software counterpart 281 manifested in CPU card 200, allow the microprocessor 230 of the IDCU to detect whenever the I/O-CPLD circuitry 380 itself has suffered a failure in which both input registers, A and B, have been rendered defective.

Regarding the function of each stage in circuit network 31, the first filter stage 311 serves not only to filter out the AC ripple that might be riding on the incoming DC signal but also to clamp the DC voltage provided to the input of the optoisolation stage 312. In particular, resistor $R_{32}$ is a load resister, serving to match the impedance of first filter stage 311 with that of the incoming trainline. During transmission of the incoming door control signal by the CDC 1, resistor $R_{32}$ allows the maximum transfer of energy from the trainline to the first filter stage 311. Resistor $R_{32}$ also aids in the discharge of capacitor $C_{70}$. Together, resistor $R_{107}$ and capacitor $C_{70}$ act as a low frequency cut-off filter, one that filters out AC ripple in frequencies above a desired level (e.g., 50 Hz.). The values for $R_{107}$ and $C_{70}$ are chosen so that whatever AC ripple passes through the filter it will be of such low amplitude that it would not adversely affect the operation of the succeeding stages.

Zener diode $D_{20}$, of course, must have its voltage rating comport with the environment in which the invention will be used. It may be implemented as a 1N4740A, for example; an ideal component if the invention is to be designed for 50V DC door control signals. Rated at 1.5V DC each, the LEDs of optocouplers $U12_A$ and $U14_A$ require approximately 3V DC, at 5–20 mA, to turn on, if they are connected in series across the input terminals of stage 312 as shown in FIG. 4. Alternatively, the LEDs may be wired in parallel to further improve the reliability of the overall circuit. Connected in series as shown in FIG. 4, the Zener diode $D_{20}$ prevents a signal, whose voltage is below the sum of the voltage ratings of diode $D_{20}$ and the LEDs, from turning on those LEDs. Consequently, by its voltage rating, the Zener diode $D_{20}$ raises the level of spurious noise that circuit network 31 can tolerate without turning on optocouplers $U12_A$ and $U14_A$. For optocouplers $U12_A$ and $U14_A$ to turn on, a valid incoming central command signal must be at least 3V DC greater than the voltage rating of Zener diode $D_{20}$. The Zener diode $D_{20}$ thus enhances the ability of the optocouplers $U12_A$ and $U14_A$ to reject spurious noise.

Diode $D_{21}$ protects the LEDs of optocouplers $U12_A$ and $U14_A$ from reverse voltages. It also serves to discharge capacitor $C_{70}$ thereby counteracting the adverse effects due to rectification of incoming AC ripple. Absent diode $D_{21}$, energy could be stored in capacitor $C_{70}$ over time due to this AC ripple. Diode $D_{21}$ is placed within stage 311 to discharge that capacitor $C_{70}$ and make the trainline impedance look the same whether the polarity of the incoming ripple is positive or negative.

The first filter stage 311 thus produces as an input to optoisolation stage 312 an initially filtered signal. Whether this initially filtered signal actually possesses a DC voltage level sufficient to turn on optocouplers $U12_A$ and $U14_A$ depends on the state of the door control trainline/signal to which first filter stage 311 is attached. When its door control trainline/signal is active, the first filter stage 311 will produce an initially filtered signal whose DC voltage is above the threshold level required to activate the optocouplers $U12_A$ and $U14_A$. Conversely, when the door control trainline/signal is inactive, the DC voltage provided by first filter stage 311 will be below the threshold required to activate the optocouplers.

The optoisolation stage 312 electronically isolates the succeeding circuit stages from the first filter stage 311 and the incoming door control trainline. Greatly reducing the likelihood of unwanted noise being transmitted to the succeeding stages, the optocouplers $U_{12}A$ and $U14_A$ serve to couple two circuit stages that operate at significantly different voltage levels. When the door control trainline is activated, first filter stage 311 is subject to the relatively high voltage level (e.g., a 50V DC central command signal) brought to it by the door control trainline. The succeeding stages 313 and 314, however, both operate at the logic voltage level (i.e., 5V DC).

After the incoming door control signal has been processed through first filter stage 311, the optoisolation stage 312 serves not only to isolate electrically the preceding and succeeding circuit stages, but also to provide an inverted, low voltage representation of the central command signal to each of the two filter circuits of second filter stage 313.

The optoisolation stage 312 thus generates twin inverted logic signals from the initially filtered signal received from the first filter stage 311. Specifically, the optocouplers $U12_A$ and $U14_A$ both activate when the DC voltage level of the initially filtered signal is above the sum of the voltage ratings of diode $D_{20}$ and the two LEDs. As is clear from FIG. 4, optoisolation stage 312 responds to such input by generating twin inverted low logic signals. Conversely, the optocouplers $U12_A$ and $U14_A$ both deactivate when the DC voltage provided to the input of optoisolation stage 312 falls below that threshold level. Optoisolation stage 312 responds to this by producing twin inverted high logic signals.

Each filter circuit in second filter stage 313 serves to filter out other noise (including EMI) that has passed through its corresponding optocoupler in optoisolation stage 312. Resistor $R_{116}$ and capacitor $C_{72}$ together serve as the filter for the signal input terminal of Schmitt trigger circuit $U13_A$. Resistor $R_{118}$ and capacitor $C_{73}$ serve as the filter for the signal input terminal of Schmitt trigger circuit $U15_A$. When the door control trainline/signal is active, $R_{116}$ and $C_{72}$ filter out most of the low frequency AC ripple that may be riding on the inverted low logic signal output by optocoupler $U12_A$. Simultaneously, resistor $R_{118}$ and capacitor $C_{73}$ filter out the low frequency AC ripple from the inverted low logic signal output by optocoupler $U14_A$. The second filter stage 313 thus provides twin filtered inverted low logic signals to output stage 314 when the input to circuit network 31 is active.

Conversely, when the door control trainline/signal is inactive, resistor $R_{116}$ and capacitor $C_{72}$ are likewise used to filter low frequency AC ripple from the inverted high logic signal output by optocoupler $U12_A$. Resistor $R_{118}$ and capacitor $C_{73}$ do the same with respect to the inverted high logic signal output by optocoupler $U14_A$. When the input to circuit network 31 is inactive, the second filter stage 313 thus provides twin filtered inverted high logic signals to output stage 314.

As compared to first stage 311, this second stage 313 is much more effective in filtering out residual AC ripple. The two filter circuits in stage 313 provide an even sharper cutoff so that little, if any, noise/voltage spikes make it through to the inputs of the Schmitt trigger circuits $U13_A$ and $U15_A$.

Bias resistor $R_{78A}$ serves to bias the voltage level at the signal input terminal of Schmitt trigger circuit $U13_A$. Bias resistor $R_{78A}$ likewise serves to bias the voltage at the signal input terminal of Schmitt trigger circuit $U15_A$. Together the bias resistor $R_{78A}$, the top filter circuit and Schmitt trigger circuit $U13_A$ provide the output of the "A" signal path in circuit network 31. Likewise in circuit network 31, bias resistor $R_{78B}$, the bottom filter circuit and Schmitt trigger circuit $U15_A$ provide the output of the "B" signal path.

When the overall door control system in which the invention is incorporated is first turned on, all of the door control trainlines/signals initially adopt the inactive state. Referring still to circuit network 31 in FIG. 4, when the invention disclosed herein is first powered up, a 5V DC feed is supplied to both bias resisters $R_{78A}$ and $R_{78B}$. With both optocouplers $U12_A$ and $U14_A$ deactivated during start up, current from this feed starts to flow through resistors $R_{78A}$ and $R_{116}$ and soon charges capacitor $C_{72}$. In the time dictated by RC time constant of those components, the voltage at the input of the Schmitt trigger circuit $U13_A$ soon rises above an upper threshold level eventually reaching 5V DC. Once the voltage rises above this upper threshold, the Schmitt trigger circuit $U13_A$, operating as an inverter, outputs a low logic level. Likewise, resistors $R_{78B}$ and $R_{118}$ and capacitor $C_{73}$ form a time constant for the input of Schmitt trigger circuit $U15_A$. This trigger circuit likewise outputs a low logic level.

It is these logic zero signals that circuit network 31 conveys to the I/O-CPLD chip 380 when the door control system is first powered up. As shown in FIG. 2B, the I/O-CPLD 380 contains the array of inverters 381. FIG. 4 shows the inverter corresponding to the "B" signal path of circuit network 31. It converts the logic zero signal output by Schmitt trigger circuit $U15_A$ to a high logic level. Consequently, when the door control system is first turned on, circuit network 31 conveys a logic zero signal to the bit 1 location of input register A, with a logic one signal being conveyed by the appropriate inverter of array 381 to the bit 8 location of input register B.

Regarding the function of output stage 314 when the door control trainline/signal goes active, the DC voltage provided to optoisolation stage 312 will then be sufficient to turn on optocouplers $U12_A$ and $U14_A$. For example, as the transistor of optocoupler $U12_A$ turns on, resistor $R_{78A}$ starts to conduct current very rapidly and this current flows through the collector-emitter junction of the transistor to ground. In addition, capacitor $C_{72}$ discharges through resistor $R_{116}$ and the collector-emitter junction of the transistor to ground. In the time dictated by RC time constant of $R_{116}$ and $C_{72}$, the voltage at the input of the Schmitt trigger falls below a lower threshold level. Once the voltage falls below the lower threshold, the Schmitt trigger circuit outputs 5V DC. Schmitt trigger circuit $U13_A$ thus re-inverts and amplifies the filtered low logic signal output by the top filter circuit of second filter stage 313.

The transistor of optocoupler $U14_A$, of course, turns on at the same time as its counterpart, optocoupler $U12_A$. Consequently, when this transistor turns on, the voltage at the input of Schmitt trigger circuit $U15_A$ falls below the lower threshold level in the time dictated by the discharge RC time constant of $R_{118}$ and $C_{73}$. Operating analogously to Schmitt trigger circuit $U13_A$, Schmitt trigger circuit $U15_A$ thus re-inverts and amplifies the filtered low logic signal output by the bottom filter circuit. In response to such low logic inputs, the two Schmitt trigger circuits each output 5V DC, i.e., a logic one signal. Each logic one signal indicates that the CDC has activated the door control signal. In the I/O-CPLD 380, however, the inverter corresponding to the "B" signal path of circuit network 31 converts the logic one signal output by Schmitt trigger circuit $U15_A$ to a low logic level. Consequently, when the door control trainline goes active, a logic one signal is conveyed to the bit 1 location of input register A and a logic zero signal to the bit 8 location of input register B.

Conversely, once the CDC deactivates the door control trainline/signal, the transistor of optocoupler $U12_A$ turns off. As this transistor turns off, the current flow through the collector-emitter junction of the transistor stops quite rapidly. Current from 5V DC feed then starts to flow through resistors $R_{78A}$ and $R_{116}$ and soon charges capacitor $C_{72}$. The charging of capacitor $C_{72}$ keeps the voltage at the input of the Schmitt trigger circuit $U13_A$ from building too quickly. In the time dictated by RC time constant of $R_{78A}$, $R_{116}$ and $C_{72}$, the voltage at the input of the Schmitt trigger soon rises above the upper threshold level eventually reaching 5V DC. Once the voltage rises above this threshold, the Schmitt trigger $U13_A$, operating as an inverter, outputs a low logic level.

Resistors $R_{78B}$ and $R_{118}$ and capacitor $C_{73}$ likewise form a time constant for the input of Schmitt trigger circuit $U15_A$. Once the voltage at its input rises above the upper threshold level, the Schmitt trigger circuit $U15_A$ also outputs a low logic level. Operating analogously to Schmitt trigger circuit $U_{13A}$, Schmitt trigger circuit $U15_A$ re-inverts the high logic signal output by the bottom filter circuit. Together, in response to such high logic inputs, the Schmitt trigger circuits $U13_A$ and $U15_A$ each output 0V DC, i.e., the logic zero signal. In the I/O-CPLD 380, however, the inverter corresponding to the "B" signal path converts the logic zero signal output by Schmitt trigger circuit $U15_A$ to a high logic level. Therefore, when the door control trainline goes inactive, a logic zero signal is conveyed to the bit 1 location of input register A and a logic one signal to the bit 8 location of input register B.

In the foregoing manner, circuit network 31 generates twin binary signals from the central command signal it receives from door control trainline to which it is attached. Twin logic one (5V DC) signals are generated when the incoming central command signal assumes an active (i.e., high) state. Conversely, twin logic zero (0V DC) signals are generated when the incoming signal assumes an inactive (i.e., low) state.

As shown in FIGS. 2A–C and 4, Schmitt trigger circuit $U13_A$ outputs a binary signal directly to the bit 1 location in input register A. Schmitt trigger circuit $U15_A$, however, outputs a binary signal to its corresponding inverter in array 381. When the incoming door control trainline/signal is active, a logical one is conveyed to the bit 1 location of input register A and a logical zero to the bit 8 location of input register B. Conversely, when the door control trainline/ signal is inactive, circuit network 31 conveys a logical zero to the bit 1 location of input register A whereas the bit 8 location of input register B receives a logical one.

All of the other circuit networks 32–38 in the optoisolator device 310 operate in the same way, with each network responding to the door control trainline to which it is connected. Circuit network 32, for example, conveys to the bit location 2 of input register A and, via an inverter in array 381, to the bit location 7 of input register B. Likewise, circuit network 38 conveys to the bit location 8 of input register A and, via another inverter in array 381, to the bit location 1 of input register B. The bit order of input register B is thus the reverse of the bit order of input register A, with the bit locations 8-1 in input register B corresponding to the bit locations 1-8 in input register A. It is with input registers A and B that the IDCU is constantly kept apprised of the current status of all of the door control trainlines.

Operating according to standard interrupt protocols, the microprocessor 230 on CPU card 200 is alerted whenever any bit in input register A changes state. In FIGS. 2A and 2C, this is illustrated by a state change detector 382 from which an interrupt line, INTR, leads to microprocessor 230. Optionally, the state change detector 382 may be applied to input register B or to both input registers. Whenever such change is detected, the microprocessor 230 using standard addressing techniques would first read input register A in the I/O-CPLD chip 380 and store its values locally in work register $W_1$. Microprocessor 230 would then read input register B, re-invert the value of each of its bits as indicated by array 281, re-order its bits to match again the order of those read from input register A as indicated by reorder matrix 282, and then store its values locally in work register $W_2$. Microprocessor 230 would then compare the contents of each work register, $W_1$ and $W_2$, bit by bit. Absent a failure of any of the components located between the incoming trainline and microprocessor 230, the value of each bit in work register $W_1$ will be identical to its counterpart in work register $W_2$. The work registers are preferably manifested in software.

As long as each bit in work register $W_1$ matches its corresponding twin bit in work register $W_2$, the microprocessor 230 will allow the IDCU to operate according to the dictates of the central command signal(s) it receives. Should any bit and its corresponding twin bit fail to match, however, the microprocessor 230 can take whatever protective actions are deemed appropriate by the transit authority. These actions would be codified in the programming code for microprocessor 230. The most important actions would, of course, be directed toward protection of the passengers in the railcar. The microprocessor 230, for example, may be programmed to prevent the IDCU from automatically opening the doors on the railcar.

Should any bit in register $W_1$ fail to match its counterpart in register $W_2$, such failure is evidence that the source of the problem lies somewhere between the input and return terminals of the affected circuit network and the microprocessor 230 itself. The system 10 thus not only confirms the validity of the incoming door control signal but also verifies that all components between the input registers and the microprocessor, including the data bus and even the controlling software, are working properly. The microprocessor 230, of course, can be programmed to inform the train operator, via audio or visual indication, whenever any circuit network and its corresponding signal path fail.

It is, of course, well within the abilities of persons of ordinary skill in the programming arts to codify the foregoing logic into the programming code for the microprocessor 230. This includes codification of the desired interrupt protocol and the preferred techniques for addressing, data comparison and error checking, as well as other tasks required to be performed by the microprocessor 230 of the invention 10.

The preferred layout for the mirror-image optoisolator device 310 is alluded to in FIGS. 3A and 3B. As mentioned earlier, the optoisolator device 310 preferably has four optocoupler chips U12, U14, U16 and U17, with each chip containing four optocouplers $U12_{A-D}$, $U14_{A-D}$, $U16_{A-D}$ and $U17_{A-D}$. The optoisolator device 310 thus contains sixteen optocouplers, two for each of the eight trainlines for which this particular layout was designed. Similarly, the layout features four Schmitt trigger chips U13, U15, U18 and U20 with each chip containing six trigger circuits $U13_{A-F}$, $U15_{A-F}$, $U18_{A-F}$ and $U20_{A-F}$. For the U13 and U15 chips, all six Schmitt trigger circuits (i.e., A–F) are used. For the U18 and U20 chips, however, only, two trigger circuits (i.e., A and B) are used. The optoisolator device 310 thus contains sixteen Schmitt trigger circuits, two for each of the eight door control trainlines for which the particular layout of FIGS. 3A and 3B was designed.

More important, however, is the way in the optocouplers and Schmitt trigger circuits are deployed. Specifically, the two optocouplers in each circuit network are contained in separate chips. The two Schmitt triggers in each circuit network are likewise contained in separate chips. For example, optocouplers $U12_A$ and $U14_A$ for the first circuit network 31 are contained within chips U12 and U14, respectively. The Schmitt triggers $U13_A$ and $U15_A$ for circuit network 31 are contained within chips U13 and U15, respectively. Consequently, for both the optocouplers and Schmitt trigger circuits, should any one chip lose its power supply or otherwise fail, its mirror image counterpart in the other chip will still be operable.

Without this mirror-image design, if the two Schmitt trigger circuits employed in each circuit network were contained within the same chip, and that chip failed, then both outputs would likely fail in the same way. This would falsely indicate to whatever DCU with which the system 10 is to be used that the door control trainline(s) of the affected circuit network(s) had been activated or deactivated. For this reason, the two optocouplers and the two Schmitt trigger circuits in each circuit network are contained in separate chips.

As noted in the background section, the transit authority according to whose requirements the system 10 must be tailored will almost always prescribe the electrical characteristics (i.e., voltage, current, polarity, function, etc.) of the central command signals to be carried on the trainlines. These signal characteristics, together with the electromagnetic environment in which the system 10 is to be used, will dictate the values for the components in each of the circuit networks. It should be apparent to persons of ordinary skill in the electronic arts that these values are not critical to an understanding of the invention. For this reason, the precise values of the resisters, capacitors and other components in the circuit networks of the mirror-image optoisolator device 310 are not provided in the text or figures of this document.

Having now disclosed the essential details of the system 10, it should be apparent that the invention disclosed herein can also be expressed in terms of a method. The first step of the method involves generating twin representations for each of the door control signals. Specifically, for each door control signal, the twin representations are manifested either as a logic one or a logic zero. The twin representations are manifested as a logic one when the door control trainline/signal is activated. Conversely, the twin representations are manifested as a logic zero when the door control trainline/signal is deactivated. The next step involves conveying the twin representations, for each door control signal, to two separate, mirror-imaged bit locations in two input registers using separate signal paths and components. Specifically, for each door control signal, a first of the twin representations is conveyed to a dedicated location in the first input register whereas a second of the twin representations, after being inverted, is conveyed to a corresponding, mirror-imaged location in the second input register. The bit order of the second input register is thus the reverse of that of the first input register. If the second representation of each door control signal was not inverted before being conveyed to its corresponding location in the second input register, the first and second input registers would be mirror-images of each other. Each of the foregoing steps is performed using the array of circuit networks 31–38 contained in optoisolator device 310, except for the inversion of the second representations done by the inverter array 281 manifested as software in CPU card 200.

The following steps are preferably performed by the microprocessor 230 of system 10. The next step involves monitoring, via an interrupt protocol, all of the locations in one or both input registers for whether any bit contained therein has changed. Whenever any such change is detected, the reading step is performed. This involves reading all of the locations of both input registers to ascertain the state of the bits contained therein. Specifically, the values of the bits in the first input register are read and then stored locally in a first work register, with the values of the bits in the second input register being (i) re-inverted to undo the earlier inversion (done by inverter array 381), (ii) reordered to match again the order of the bits read from the first input register, and (iii) stored locally in a second work register. In the comparison step, each bit in the first work register is compared with its corresponding twin bit now contained in the second work register. The outcome of the final step depends on whether the values of these bit pairs match. Should each bit read from the second work register match its corresponding twin bit read from the first work register, the final step is essentially manifested as a command to the IDCU to operate according to the dictates of door control signal(s) it has received. Should any bit and its corresponding twin bit fail to match, however, the final step involves commanding the IDCU to take whatever protective action is deemed appropriate. This method verifies the integrity of the circuitry contained within the system 10.

As an alternative to the preferred embodiments presented above, the system and method disclosed in this document could be implemented without the inverter array 381 in I/O-CPLD chip 380 and its software counterpart 281 manifested in CPU card 200. Such an alternative embodiment would preferably feature another means of detecting whenever the I/O-CPLD circuitry 380 itself has suffered a failure in which both input registers, A and B, have been rendered defective.

The preferred and alternative embodiments for carrying out the invention have been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and the useful arts, I secure for myself by Letters Patent exclusive rights to all subject matter embraced by the following claims for the time prescribed by the Patent Act.

I claim:

1. A method of verifying the authenticity of signals to be inputted into an apparatus, said method comprising the steps of:
    (a) generating twin representations for each of said signals to be inputted into said apparatus, said twin representations embodying either a logic one or a logic zero depending on the state of said signal corresponding thereto;
    (b) inverting, for each of said signals, one of said twin representations;
    (c) conveying, for each of said signals, (i) an uninverted one of said twin representations to a location in a first input register and (ii) said inverted one of said twin representations to a mirror-imaged location in a second input register, so that the bit order of said second input register is the reverse of that of said first input register;
    (d) monitoring at least one of said input registers for whether any bit in said locations therein has changed;
    (e) reading, whenever any such change is detected, both of said input registers for said bits in said locations thereof such that (i) said bits in said first input register are conveyed to a first work register and (ii) said bits in said second input register are re-inverted, reordered to match again the order of said bits read from said first input register, and conveyed to a second work register;
    (f) comparing each said bit read from one of said work registers with its corresponding twin bit read from the other of said work registers; and
    (g) commanding said apparatus to (i) operate according to the dictates of said signal(s) should each bit read from said one work register match its corresponding twin bit read from said other work register and (ii) take protective action should any one of said bits read from said one work register fail to match its corresponding twin bit read from said other work register.

2. The method claimed in claim 1 wherein step (a) involves electrically isolating said apparatus from the electrical wires on which said apparatus receives said signals.

3. A system for verifying the authenticity of input signals used in the operation of an apparatus, said system comprising:
    (a) a plurality of circuit networks, each of said circuit networks for generating twin -binary signals from one of said input signals, said twin binary signals embodying either a logic one or a logic zero depending on the state of said input signal corresponding thereto;
    (b) an array of inverters, each of said inverters for inverting one of said twin binary signals generated by one of said circuit networks;
    (c) two input registers, each of said input registers having one bit location for each of said circuit networks, with (i) an uninverted one of said twin binary signals being conveyed to a particular location in a first of said input registers and (ii) an inverted one of said twin binary signals being conveyed to a mirror-imaged location in a second of said input registers, so that the bit order of said second input register is the reverse of that of said first input register; and
    (d) a microprocessor unit having two work registers, said microprocessor unit for (i) monitoring at least one of said input registers for whether any bit in any of said locations has changed, (ii) reading, whenever any such change is detected, both of said input registers for said bits in said locations such that said bits read from said first input register are conveyed to a first of said work registers and said bits in said second input register are re-inverted, reordered to match again the order of said bits read from said first input register and conveyed to a second of said work registers; (iii) comparing each said bit read from one of said work registers with its corresponding twin bit read from the other of said work registers, and (iv) commanding said apparatus to (A) operate according to the dictates of said input signal(s) should each bit read from said one work register match its corresponding twin bit read from said other work register and (B) take protective action should any one of said bits read from said one work register fail to match its corresponding twin bit read from said other work register.

4. The system claimed in claim 3 wherein each of said circuit networks includes a first filter stage, an optoisolation stage, a second filter stage, and an output stage with:

(a) said first filter stage for filtering out noise from said input signal and for generating therefrom as an input to said optoisolation stage an initially filtered signal having DC voltage (i) above a threshold level when said input signal assumes an active state and (ii) below said threshold level when said input signal assumes an inactive state;

(b) said optoisolation stage for electrically isolating preceding and succeeding stages and for generating twin inverted logic signals from said initially filtered signal such that (i) twin inverted low logic signals are generated in response to said initially filtered signal exhibiting voltage above said threshold level and (ii) twin inverted high logic signals are generated in response to said initially filtered signal exhibiting voltage below said threshold level;

(c) said second filter stage for filtering out noise from each of said twin inverted logic signals received from said optoisolation stage to produce twin filtered signals as input to said output stage; and (d) said output stage for re-inverting and amplifying each of said twin filtered signals received from said second filter stage to produce said twin binary signals.

5. The system claimed in claim 4 wherein said first filter stage includes (i) an RC filter for filtering out noise from said input signal and (ii) circuitry for protecting said circuit network from reverse voltages and other adverse electrical influences.

6. The system claimed in claim 4 wherein said optoisolation stage includes two optocouplers connected in series across the output of said first filter stage, each of said optocouplers for converting said initially filter signal into one of said twin inverted logic signals.

7. The system claimed in claim 4 wherein said optoisolation stage includes two optocouplers connected in parallel across the output of said first filter stage, each of said optocouplers for converting said initially filter signal into one of said twin inverted logic signals.

8. The system claimed in claim 4 wherein said second filter stage includes two RC filter circuits, each of said RC filter circuits for filtering out noise from one of said twin inverted logic signals received from said optoisolation stage and thereby producing therefrom one of said twin filtered signals.

9. The system claimed in claim 4 wherein said output stage includes two inverting Schmitt trigger circuits, each of said Schmitt trigger circuits for re-inverting and amplifying one of said twin filtered signals received from said second filter stage and thereby producing therefrom one of said twin binary signals.

10. A method of verifying the authenticity of input signals used in the operation of an apparatus, said method comprising the steps of:

(a) generating twin representations for each of said signals, said twin representations embodying either a logic one or a logic zero depending on the state of said signal corresponding thereto;

(b) conveying, for each said signal, (i) a first of said twin representations to a location in a first register and (ii) a second of said twin representations to a mirror-imaged location in a second register, so that the bit order of said second register is the reverse of that of said first register thereby making said registers mirror-images of each other;

(c) monitoring at least one of said registers for whether any bit in said locations therein has changed;

(d) reading, whenever any such change is detected, both of said registers for said bits in said locations thereof;

(e) comparing each said bit read from one of said registers with its corresponding mirror-imaged bit read from the other of said registers; and (f) commanding said apparatus to (i) operate according to the dictates of said input signal(s) should each bit read from said one register match its corresponding mirror-imaged bit read from said other register and (ii) take protective action should any bit read from said one register fail to match its corresponding mirror-imaged bit read from said other register.

11. The method claimed in claim 10 wherein step (a) involves electrically isolating said apparatus from the electrical wires on which said apparatus receives said signals.

12. A system for verifying the authenticity of input signals used in the operation of an apparatus, said system comprising:

(a) a plurality of circuit networks, each of said circuit networks for generating twin binary signals from one of said input signals such that (i) twin logic one signals are generated when said input signal corresponding thereto assumes an active state and (ii) twin logic zero signals are generated when said input signal corresponding thereto assumes an inactive state;

(b) two registers, each of said registers having one bit location for each of said circuit networks, each of said circuit networks for conveying (i) a first of said twin binary signals generated thereby to a particular location in a first of said registers and (ii) a second of said twin binary signals generated thereby to a mirror-imaged location in a second of said registers, so that the bit order of said second register is the reverse of that of said first register thereby making said registers mirror-images of each other; and (c) a microprocessor unit for (i) monitoring at least one of said registers for whether any bit in said locations therein has changed, (ii) reading, whenever any such change is detected, both of said registers for said bits in said locations, (iii) reversing the order of said bits read from said second register to match again the order of said bits read from said first register, (iv) comparing each said bit read from one of said registers with its corresponding twin bit read from the other of said registers, and (v) commanding said apparatus to (A) operate according to the dictates of said input signal(s) should each bit read from said one register match its corresponding twin bit read from said other register and (B) take protective action should any bit read from said one register fail to match its corresponding twin bit read from said other register.

13. The system claimed in claim 12 wherein each of said circuit networks includes a first filter stage, an optoisolation stage, a second filter stage, and an output stage with:

(a) said first filter stage for filtering out noise from said input signal and for generating therefrom as an input to said optoisolation stage an initially filtered signal having DC voltage (i) above a threshold level when said input signal assumes said active state and (ii) below said threshold level when said input signal assumes said inactive state;

(b) said optoisolation stage for electrically isolating preceding and succeeding stages and for generating twin inverted logic signals from said initially filtered signal such that (i) twin inverted low logic signals are generated in response to said initially filtered signal exhibiting voltage above said threshold level and (ii) twin inverted high logic signals are generated in response to said initially filtered signal exhibiting voltage below said threshold level;

(c) said second filter stage for filtering out noise from each of said twin inverted logic signals received from said optoisolation stage to produce twin filtered signals as input to said output stage; and (d) said output stage for re-inverting and amplifying each of said twin filtered signals received from said second filter stage to produce said twin binary signals conveyed by said circuit network to said particular and said mirror-imaged locations in said first and said second registers, respectively.

14. The system claimed in claim 13 wherein said first filter stage includes (i) an RC filter for filtering out noise from said input signal and (ii) circuitry for protecting said circuit network from reverse voltages and other adverse electrical influences.

15. The system claimed in claim 13 wherein said optoisolation stage includes two optocouplers connected in series across the output of said first filter stage, each of said optocouplers for converting said initially filter signal into one of said twin inverted logic signals.

16. The system claimed in claim 13 wherein said optoisolation stage includes two optocouplers connected in parallel across the output of said first filter stage, each of said optocouplers for converting said initially filter signal into one of said twin inverted logic signals.

17. The system claimed in claim 13 wherein said second filter stage includes two RC filter circuits, each of said RC filter circuits for filtering out noise from one of said twin inverted logic signals received from said optoisolation stage and thereby producing therefrom one of said twin filtered signals.

18. The system claimed in claim 13 wherein said output stage includes two inverting Schmitt trigger circuits, each of said Schmitt trigger circuits for re-inverting and amplifying one of said twin filtered signals received from said second filter stage and thereby producing therefrom one of said twin binary signals.

* * * * *